United States Patent Office 3,558,505
Patented Jan. 26, 1971

3,558,505
WATER-EMULSIFIABLE COMPOSITION
Adolf Mlot-Fijalkowski, Elmwood Park, Ill., assignor to Magnaflux Corporation, Chicago, Ill., a corporation of Delaware
No Drawing. Filed June 20, 1967, Ser. No. 647,340
Int. Cl. B01j *13/00*
U.S. Cl. 252—312                                                                                  9 Claims

ABSTRACT OF THE DISCLOSURE

A water-emulsifiable liquid composition having a nonaqueous oily liquid portion and an emulsifying agent or surfactant mixed therewith to render the composition water-emulsifiable or water-washable, and additionally containing a cyclic terpene alcohol, e.g. alpha terpineol, or a mixture of isomeric tertiary and secondary cyclic terpene alcohols, to increase the water tolerance of said composition to such an extent that a stable, clear or transient liquid emulsion is formed when as much as 5 to 100% by volume of water is incorporated into said composition. The water-emulsifiable liquid composition is particularly adapted for use in the penetrant method of nondestructive testing, either as an emulsifier or as a penetrant (when having dissolved therein a dye or dyes to give the penetrant color under "white" or "black" light).

BACKGROUND OF THE INVENTION

This invention relates to a water-emulsifiable liquid composition for use in the penetrant method for the nondestructive testing of rigid articles to detect surface discontinuities therein. My present water-emulsifiable composition is similar to that disclosed in the Parker Pat. No. 2,978,418, dated Apr. 4, 1961, and like the composition of the patent can be used in a nondestructive method of detecting surface discontinuities such as that described and claimed in the Parker et al. Pat. No. 2,806,959, issued Sept. 17, 1957. In place of the tri-butoxyethyl phosphate included in the composition of the 2,978,418 patent, I employ a cyclic terpene alcohol for the purpose of increasing the water tolerance of the water-emulsifiable liquid composition of my present invention.

In the method disclosed in the 2,806,959 patent an oily liquid penetrant having excellent penetrating qualities but immiscible with water, and preferably free from any emulsifying agent, is caused to penetrate any surface flaws, or discontinuities. A fluorescent or nonfluorescent dye is usually dissolved in the oily penetrant in order to give a contrasting visual indication of the location and type of surface flaw, or discontinuity, present in the surface undergoing test. After the application of the oily penetrant, an emulsifying liquid is applied over the test surface that is capable, upon substantially static contact with the oily penetrant, of rendering the latter superficially water-emulsifiable.

In the subsequent step of removing the superficial, emulsified layer of penetrant, together with the excess of emulsifying agent, without removing the unemulsified penetrant that has penetrated into any surface discontinuities, streams of water are used in what is termed a washing step. The penetrant that is left in the surface discontinuities after the washing step serves to indicate the existence and location of surface discontinuities when the surface is inspected under suitable lighting conditions. These include "white" light if a visible dye is used in the penetrant, and "black" light if a fluorescent dye is used. A developer, either wet or dry, can be used to enhance the visibility of the indication.

Instead of being used as an emulsifying liquid for application over an oily penetrant, the water-emulsifiable liquid composition of my invention can itself be used as a water-washable penetrant. For that purpose, there is usually included in the composition a suitable dye, either visible or fluorescent. When used as the penetrant, the excess of the penetrant can be removed by water-washing without an intermediate application over the penetrant of a liquid emulsifying composition, since my water emulsifiable composition is self-emulsifying and can be easily washed off with water.

SUMMARY OF THE INVENTION

In order to increase the effectiveness of the liquid, water-emulsifiable composition, I include therein a terpineol, or one or more cyclic terpene alcohols, in a sufficient amount to increase the water tolerance of the composition to an extent such that it is capable of forming a stable, clear or translucent, emulsion with as much as from 5 to 100% by volume of water, the percent being based upon the nonaqueous portion of the composition. It is common for water-emulsifiable compositions, in general, to exhibit a definite increase in viscosity upon the addition of water. However, the use of alpha terpineol in a water-emulsifiable composition, such as herein described in connection with the examples, causes a decrease in viscosity upon the addition of water.

In order to be suitable for use as a water-wash penetrant in the penetrant method of testing for surface discontinuities, my water-emulsifiable composition should have as low a viscosity as possible, and the viscosity should remain fairly constant, even though it may be at different levels, after the formation of a water emulsion therewith. For a low viscosity emulsifier, a viscosity as low as 30 cs. and generally of around 50 to 55 cs. at 100° F. has been found satisfactory, while for a high viscosity composition, a viscosity of between 110 and 120 cs. at 100° F. has been found suitable. When my water-emulsifiable composition is used as an emulsifier (rather than as a penetrant), the speed of emulsification is related, among other factors, to the viscosity, the lower the viscosity the higher the speed of emulsification. This, however, has no direct bearing upon the use of my composition as a penetrant.

It is, therefore, an important object of this invention to provide a liquid, water-emulsifiable composition having a high water tolerance and capable of forming water emulsions that are stable and that have properties peculiarly adapting them for use either as an emulsifier or as a penetrant in nondestructive, penetrant methods of testing for surface discontinuities.

Other and further objects of this invention will become apparent from the following description and appended claims.

In designating the composition of my present invention as a water-emulsifiable composition, it will be understood that the composition may, itself, contain water and may be capable of being mixed with additional quantities of water to form a relatively clear or translucent, stable emulsion; or, on the other hand, the composition may be free of water but capable of forming with water an emulsion such as described. In order to be a satisfactory emulsifying composition for use in non-destructive penetrant methods of testing for surface discontinuities, my water-emulsifiable composition should be capable of tolerating a total amount of water, both that normally present in the composition and that deliberately added thereto, or necessarily incorporated therein as a result of its use, of at least 5 volume percent based upon the volume of the non-aqueous portion of the composition. This basis is used hereinafter and in the claims in expressing the volume percent of water with which my water-emulsifiable composition must be completely miscible in order to form a clear or translucent emulsion.

When used as a water-washable penetrant, the base or vehicle is preferably water-free and is a liquid organic solvent that has a relatively low viscosity, the lower the better, so as to penetrate the surface discontinuities most readily. Viscous lubricating oils or mineral oils are avoided in favor of light petroleum oils, such as kerosene, or aromatic hydrocarbons.

My composition, in general and regardless of its intended use as a penetrant or as an emulsifier, comprises an oily vehicle. In the case of an emulsifier, the vehicle is preferably a mineral oil, such as kerosene, a mineral seal oil, a fuel oil, or a lubricating oil, or some mixture of two or more of these various types of oils. The particular oil, or mixture of oils to be used, is selected in accordance with the viscosity that is desired in the final water-emulsifiable composition. For instance, mineral seal oil, which is a relatively thin, non-viscous oil, may suitably be mixed with a heavy paraffin oil, which has a viscosity corresponding with that of common lubricating oils, and by a proper adjustment of the respective proportions of these two types of oil, it is possible to get the viscosity that is desired in the final water-emulsifiable composition that is to be used as an emulsifier.

My composition for emulsifier use also ordinarily contains an emulsifying agent, or an emulsifying aid, such as a liquid sulfonation product that is miscible both with water and with oil, with or without coupling agents, wetting agents and/or detergents, the total volume of oily vehicle, including oil plus sulfonate and, when included, coupling agents, wetting agents and/or detergents, being considered the nonaqueous portion of the composition and being between the limits of about 70 to 99 volume percent of the whole, the cyclic terpene alcohol, or a mixture of such alcohols, making up the balance of between about 1 and 30% by volume. An example of a suitable liquid sulfonation product is a petroleum sulfonate such as can be prepared by sulfonating petroleum oils and then neutralizing, or partially neutralizing, to obtain the alkali metal sulfonate, such as a sodium sulfonate. A petroleum sulfonate designated as No. 745 and being a proprietary product of Pennsylvania Refining Company, is an example of a suitable petroleum sulfonate.

In place of petroleum sulfonates, other oil-and-water miscible sulfonates may be used such as the so-called amine sulfonates, which are available through various sources under such proprietary names as: G-3300 Amine Sulfonate, a product of Atlas Powder Company, and believed to be an amine salt of an alkylaryl sulfonate; and P-1059 Amine Sulfonate, a product of Emulsol Corporation and believed to be isopropyl amine dodecyl-benzene sulfonate.

All of the so-called amine sulfonates are anionic from a functional standpoint.

In addition to the amine sulfonates, various wetting agents or detergents may be used, including nonionic agents, such as Emcol 61, believed to be a propyl amide of oleic acid; and Triton X-100, a product of Rohm & Haas Co., which is further identified hereinafter.

It is sometimes desirable to use a glycol or a glycol ether (both of which are broadly included within the term "a glycol," as used herein), as a coupling agent for the oil and the sulfonate employed. Among the glycols that have been found useful are dipropylene glycol, diethylene glycol, diethylene glycol monobutylether and hexylene glycol.

DESCRIPTION OF THE PREFERRED EMBODIMENTS

Examples of suitable water-emulsifiable compositions within the scope of my invention are as follows:

Example I—Emulsifier

| Ingredients: | Percent by vol. |
|---|---|
| Petroleum sulfonate | 29.0 |
| Dipropylene glycol | 4.5 |
| Triton X-100 | 6.7 |
| Mineral seal oil 1031 | 25.0 |
| Process oil C-471NS | 28.0 |
| Alpha Terpineol | 6.8 |

The physical properties of the emulsifier of Example I include the following:

API gravity—17.1° at 60° F.
Viscosity—111.0 cs. at 100° F.
Volatility—1.05% by weight (72 hrs. at 100°+5° F.)
Flash point—300° F.
pH—9.1

The viscosity of the emulsifier of Example I is reduced from 110 cs. to about 81 cs., both at 100° F., when it contains 5% by vol. of water. A similar reduction holds true for the emulsifier of Example II and the water-wash penetrant of Example III and IV.

In the foregoing formula of Example I—Emulsifier, a suitable petroleum sulfonate is Shell's Pale Petroleum Sulfonate, a product of Shell Oil Company, but any regular petroleum sulfate can be employed. In place of dipropylene glycol, any water soluble glycol, such as diethylence glycol, ethylene glycol and others can be used.

Instead of mineral seal oil, a paraffin oil can be used.

Triton X-100 is believed to be an alkyl phenoxy polyethoxy ethanol with 9 to 10 oxyethylene groups per molecule. Other similar compounds having from 1 to 15 oxyethylene groups per molecule and mixtures of such compounds having respectively, different numbers of oxyethylene groups but having an average number of such groups within the limits specified and having at least limited miscibility with water can be used satisfactorily, i.e., mixtures of Triton X-45 and X-100.

Depending upon the viscosity desired, the relative proportions of mineral seal oil and process oil, in the above formulation can be varied considerably. An emulsifier embodying the exact formula of Example I has a viscosity of about 110 cs. at 100° F., whereas if the amounts of mineral seal oil and of process oil are 35% and 18%, respectively, without other change in the formula, the viscosity is about 70 cs. at 100° F. The lower the viscosity, the more rapidly will emulsification take place when the emulsifier is used in the post-emulsification process of the aforesaid Pat. No. 2,806,959. Other oils, such as C-255NS and Sun Oil Company's Sunthene #310, can be used for Process Oil C-571NS.

The terpineol preferred for use in my composition is alpha terpineol, although beta and gamma terpineols, or a mixture of alpha, beta and gamma terpineols, can be substituted satisfactorily. In place of a terpineol, other nonbenzenoid, cyclic terpene alcohols (i.e., having an (OH), or alcohol group) can be used. Such compounds as borneol, Terpineol #318, and proprietary products, such as Herco and Yarmor pine oils available from Central Solvents & Chemicals Company and listed under "Terpene Solvents" in that company's catalog, can also be used. All of these compounds are included within the term "cyclic terpene alcohols" as used herein. Alpha terpineol is a cyclic alcohol having the following structural formula:

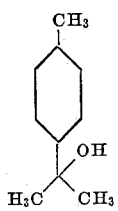

Yarmor pine oil is said to consist largely of isomeric tertiary and secondary, cyclic terpene alcohols having the empirical formula $C_{10}H_{18}O$.

Example II—Low sulfur emulsifier

| Ingredients: | Percent by vol. |
|---|---|
| Triton X–100 | 14.5 |
| Hi Sol 4–3 | 12.9 |
| Oleic acid | 0.9 |
| Sole Terge No. 325 | 4.3 |
| Sunoco No. 338 Oil | 57.0 |
| Terpineol (alpha) | 10.4 |

This formula of Example II contains no sulfonates and is, therefore, substantially free of sulfur.

Hi Sol 4–3 is a proprietary product of R. J. Brown Co. and is a highly aromatic (about 98%) petroleum oil.

Sole Terge No. 325 is a proprietary product of Hodag Chemical Co., Skokie, Ill., and is believed to be a condensation product of diethanolamine and lauric acid. Other amide condensation products can be used.

Sunoco No. 338 oil is a proprietary product of Sun Oil Co. and said to be a naphthenic rubber process and extender oil. Other process oils, such as those previously mentioned, can be used in the formula of Example II.

Example III—Penetrant, water washable and low sulfur content

| Ingredients: | Percent by vol. |
|---|---|
| Hi Sol 4–3 | 10 |
| Santicizer 141 | 5 |
| Alpha Terpineol | 10 |
| Sunthene No. 310 | 25 |
| Apco No. 467 | 30 |
| Triton X–114 | 20 |

In 100 gals. of a penetrant liquid vehicle of the above formula, there are dissolved 10 lb. of Fuoranthene and 6.5 lbs. of Fluorol 7GA (a fluorescent dye of General Aniline and Film Co.) in order to provide a fluorescent penetrant of high intensity.

Santicizer 141 is a proprietary product of Monsanto Chemical Co. and is said to be an alkylaryl phosphate and to be useful as a plasticizer.

Fuoranthene is a brightener for fluorescent dyes, of which Fluorol 7GA is merely typical.

The physical properties of the penetrant of Example III include the following:

Viscosity—8.3 cs. at 100° F.
Water tolerance—13.8% by vol.
Evaporation rate—6.5% by vol. in 72 hrs. at 109° F.
Flash point—190° F. (closed cup)
Sulfur content—0.051%

Example IV—Penetrant

| Ingredients: | Percent by vol. |
|---|---|
| Solvent D–74 | 10 |
| Santicizer 141 | 10 |
| Alpha Terpineol | 10 |
| Apco No. 467 | 25 |
| Triton X–114 | 20 |
| DD Kerosene | 25 |

In 100 gals. of the foregoing liquid vehicle are dissolved 10 lbs. of fluoranthene and 5 lbs. of Fluorol 7GA.

Solvent D–74 is a heavy aromatic solvent obtainable from Technical Petroleum Company, and DD Kerosene is a light petroleum solvent obtainable from the same company.

Apco No. 467 is a light petroleum distillate, used as a thinner.

The physical properties of the water-washable penetrant made in accordance with the formula of Example IV include the following:

Viscosity—4.52 cs. at 100° F.
Water tolerance—11.5% by vol.
Evaporation rate—11.7% by vol. in 72 hrs. at 109° F.
Flash point—157° F.
Sulfur content—0.046%.

In general, the combined volume of oil and emulsifier, wetting agent, coupling agent and the like is termed herein and in the claims as the "nonaqueous vehicle." In an emulsifier, this "nonaqueous vehicle" can be varied between 70 and 99%, and the volume of the selected terpineol or other cyclic terpine alcohol can be varied between 30 and 1% of the total volume of the composition. Ordinarily, however, it is not economically desirable to go over about 15 volume percent of the alpha terpineol in the final composition, and a very satisfactory formulation is one containing about 10 volume percent of alpha terpineol.

In place of Triton X–100, other nonionic, and also anionic, wetting agents can be used. Where a particular glycol has been specified, any of the other glycols, including glycol ethers, can be substituted.

The following formulations have been found suitable for use as fluorescent penetrants:

Formula 1

Terpineol 318—80% by volume
Triton X–100—20% by volume
Fluoranthene—20 lbs./100 gallons
Fluorol 7GA—7 lbs./100 gallons Formula 2

Terpineol 318—50%
Triton X–100—20%
Apco 467—30%
Fluoranthene—20 lbs./100 gallons
Fluorol 7GA—7 lbs./100 gallons Terpineol 318 is used not only as the basic solvent for the dyes but also as a coupling agent (to couple Triton X–100 with Apco 467) and as a water tolerance builder.

It will be noted that in these penetrant formulations the terpineol compound (here a liquid) can be the major constituent (viz. up to 80% by volume) of the nonaqueous vehicle, or, as in Formulation #2, it can be mixed with a relatively volatile hydrocarbon solvent, Apco 467, as a diluent. These formulations are water-washable.

Of the various cyclic terpene alcohols that I have tried out, alpha, beta and gamma terpineols, and the pin oils hereinabove specified, or mixtures thereof, give most satisfactory results. These cyclic terpene alcohols have a novel and surprising effect, since they are themselves almost completely insoluble or only slightly soluble in water. None of them, to the best of my knowledge, has ever been used to increase the water tolerance of a water-emulsifiable composition for use in the penetrant inspection method or to provide a liquid penetrant that is water-washable in and of itself. I have discovered, however, that the cyclic terpene alcohols have the ability not only to enhance the water tolerance, but also the emulsifying effectiveness of a liquid, oily, emulsifier and the water-washable properties of a liquid penetrant. In the absence of one or more of the cyclic terpene alcohols, the addition of water would tend to cause the formation of a gel in many penetrants even where the amount of water is much less than 10 volume percent of the nonaqueous portion of the penetrant composition.

It will be understood that modifications and variations may be effected without departing from the scope of the novel concepts of the present invention.

I claim as my invention:

1. In the liquid penetrant method of detecting surface discontinuities, the steps of applying to the surface undergoing test a liquid testing composition consisting essentially of from 20 to 99 volume percent of a nonaqueous liquid hydrocarbon vehicle, and a liquid cyclic terpene alcohol selected from the group consisting of alpha, beta and gamma terpineols, borneol, pine oils and mixtures thereof equivalent in amount to between 1 and 80 volume percent of the total volume of said testing composition and sufficient in amount to render said testing composition capable of forming a stable, clear or translucent emulsion with an amount of water equivalent to 5 volume percent and over of water by volume of said nonaqueous liquid vehicle, and washing said applied liquid testing composition off to said tested surface with water.

2. A method as defined by claim 1, wherein said liquid cyclic terpene alcohol is one selected from the group consisting of alpha-, beta- and gamma-terpineols and mixtures thereof and is present in an amount not over about 15 volume percent.

3. A method as defined by claim 2, wherein said nonaqueous vehicle comprises a mineral oil in an amount up to about 53 volume percent and the remainder an anionic or nonionic emulsifier aid.

4. A method as defined by claim 3, wherein said composition additionally contains a dye dissolved therein adapting said composition for use as a water-washable colored liquid penetrant.

5. A method as defined by claim 4, wherein said nonaqueous vehicle includes a relatively volatile hydrocarbon solvent in addition to the mineral oil.

6. A method as defined by claim 3, wherein said nonaqueous vehicle includes a petroleum sulfonate and said test composition is adapted to be used as an emulsifier prior to washing a penetrant-treated surface off with water.

7. A water-emulsifiable liquid testing composition for use in detecting surface discontinuities in articles, said composition consisting essentially of: from 20 to 99 volume percent of a nonaqueous liquid hydrocarbon vehicle, and from 80 to 1 volume percent of a liquid cyclic terpene alcohol selected from the group consisting of alpha, beta and gamma terpineols, borneol, pine oils and mixtures thereof, said terpene alcohol being present in a sufficient amount to render said testing composition capable of forming a stable, clear or translucent emulsion with an amount of water equivalent to 5 volume percent and over by volume of said nonaqueous liquid hydrocarbon vehicle.

8. A testing composition as defined by claim 7, wherein said testing composition contains a dye dissolved therein adapting said composition for use as a penetrant.

9. A water-emulsifiable liquid testing composition as defined by claim 7, wherein a liquid cyclic terpene alcohol is selected from the group consisting of alpha-, beta- and gamma-terpineols.

References Cited

UNITED STATES PATENTS

| | | | |
|---|---|---|---|
| 2,374,113 | 3/1945 | Towe | 252—118 |
| 2,978,418 | 3/1961 | Parker, Jr. | 252—312 |
| 3,419,494 | 12/1968 | Teeter et al. | 252—312 |

JOHN D. WELSH, Primary Examiner

W. E. SCHULZ, Assistant Examiner

U.S. Cl. X.R.

252—33.4, 42.4

UNITED STATES PATENT OFFICE
CERTIFICATE OF CORRECTION

Patent No. 3,558,505　　　　　Dated January 26, 1971

Inventor(s) Adolf Mlot-Fijalkowski

It is certified that error appears in the above-identified patent and that said Letters Patent are hereby corrected as shown below:

Column 4, line 25, cancel the symbol "+" and substitute the symbol --+--;
　　　　　　　line 26, after "point", cancel the dash line "-" and substitute the sign for greater than -- > --;
　　　　　　　line 62, cancel "C-571NS", and substitute --C-471N
Column 5, lines 47 and 54, correct the spelling of--Fluoranther
Column 6, line 20, correct the spelling of --terpene--.

Signed and sealed this 26th day of October 1971.

(SEAL)
Attest:

EDWARD M. FLETCHER, JR.　　　　　ROBERT GOTTSCHALK
Attesting Officer　　　　　　　　　Acting Commissioner of Pate